United States Patent [19]

Thorne-Symmons, deceased et al.

[11] 3,822,717
[45] July 9, 1974

[54] ANTI-SIPHON DEVICE
[76] Inventor: Eric Thorne-Symmons, deceased, 95 Hamlet Gardens, late of London, England, Freda Irene Thorne-Symmons, administratrix
[22] Filed: Feb. 8, 1972
[21] Appl. No.: 224,473

[30] Foreign Application Priority Data
Feb. 25, 1971  Great Britain...................... 5427/71
Jan. 5, 1972  Great Britain........................ 504/72

[52] U.S. Cl. ............................................. 137/218
[51] Int. Cl. ........................................... F16k 45/00
[58] Field of Search ........ 137/216.2, 102, 217, 107, 137/218, 512.3, 532, 533, 534, 614.2, 625.33, 625.4; 251/233

[56] References Cited
UNITED STATES PATENTS
1,289,349  12/1918  Zimmer .......................... 137/625.4
2,591,274  4/1952  Mahoney ....................... 137/625.33
2,646,815  7/1953  Leventhal ........................... 137/218
2,893,418  7/1959  Leventhal ........................... 137/218
3,083,733  4/1963  Rust ............................... 137/625.33

Primary Examiner—Henry T. Klinksiek
Attorney, Agent, or Firm—Bacon & Thomas; Jerry A. Thiebeau; Francis D. Thomas, Jr.

[57] ABSTRACT

An anti-siphon device particularly for use with a ball float valve assembly in a water storage tank, having an inlet and an outlet with a passageway therebetween, a closure member seated in the passageway and being freely movable from a seated position in which it seals a plurality of ports leading from the passageway to atmosphere to an unseated position in which the ports are open when any suction occurs at the inlet to prevent return flow of water through the device.

9 Claims, 5 Drawing Figures

PATENTED JUL 9 1974 3,822,717

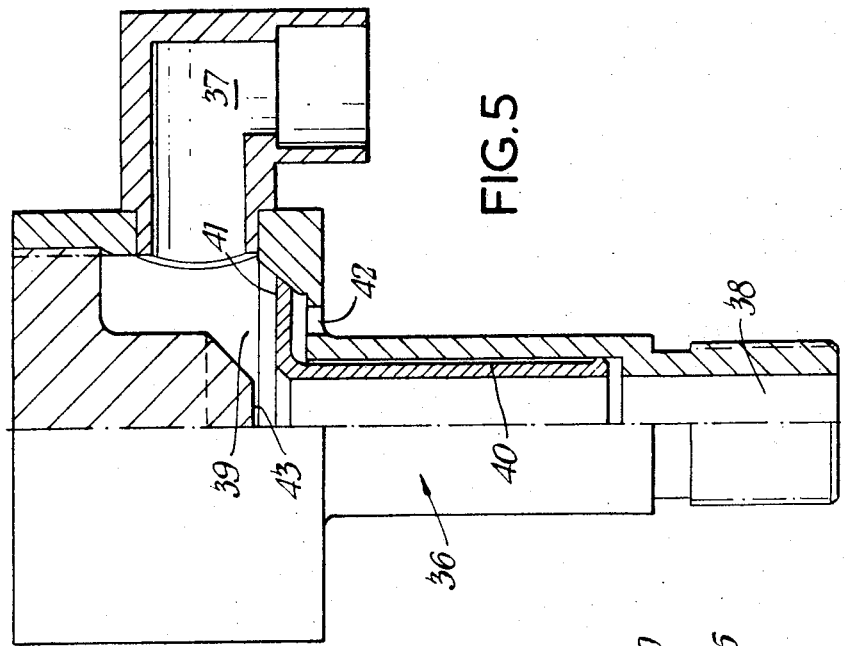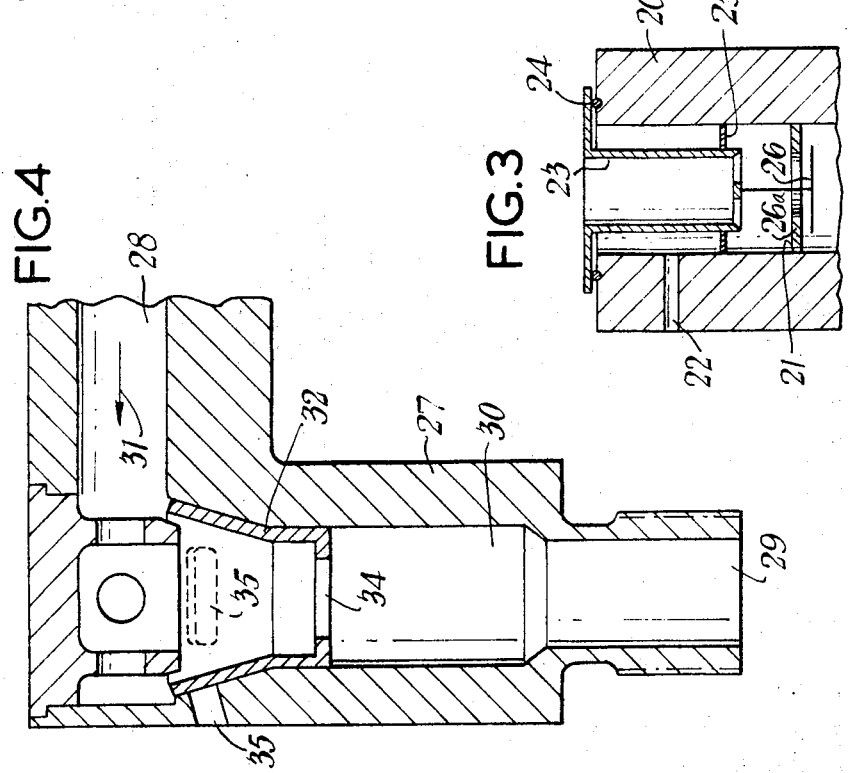

ANTI-SIPHON DEVICE

This invention relates to an improved anti-siphon device particularly applicable for use with ball float valve assemblies.

Domestic and industrial water supply systems normally include one or more header or storage tanks in which cold water is stored for use. These tanks are supplied with water either directly from the mains water supply or from a further tank within the system and, as water is drawn from a tank, the ball float valve assembly operates to enable the tank to be refilled to the predetermined level. If the water flowing to refill the tank is discharged directly from the ball float valve assembly, excessive noise will result and it is the current practice to provide a down pipe from the ball float valve assembly to near to the bottom of the tank, so that water is discharged to refill the tank from below the level of the water within the tank thus resulting in comparatively silent refilling.

The use of a downpipe, however, presents an additional problem in that because the ball float valve assembly will be in the open position during refilling of the tank, if there is any reverse flow of water, this water may find its way back into the mains and the mains supply may become contaminated.

There have been several efforts to overcome this problem, for example, one way valves, particularly ball valves, have been proposed, but these all have the disadvantage that there is a tendency for them to malfunction due to corrosion or the presence of foreign particles. A further way of overcoming this problem is to provide an anti-siphon arrangement and it has been proposed to provide a permanently open aperture in the wall of the ball float valve assembly downstream of the valve whereby if there is any suction from upstream of the ball float valve assembly which would normally create return flow, air will be drawn through this aperture with the hope that no excessive return flow of water will occur. The presence of this permanently open aperture within the ball float valve assembly does, however, have the disadvantage that a considerable amount of noise ensues when the tank is being refilled because water passes out through this aperture, which must be above the water line, to the tank. There is also the possibility that this aperture could become clogged and the anti-siphon arrangement will then not function. Still further, because the anti-siphon aperture forms part of the ball float valve assembly and this assembly must necessarily be fairly close to the filled water line of the tank, there is always the possibility that if the ball float valve assembly does not function correctly and the water level rises too high, contaminated water may find its way back through the anti-siphon aperture and pollute the mains supply.

It is the main object of this invention to provide an improved anti-siphon device which is simple in construction and operation.

According to the present invention there is provided an anti-siphon device, comprising a casing having an inlet and an outlet for liquid and a passageway within the device allowing communication between the inlet and outlet, at least one port leading from the passageway to atmosphere and a freely movable closure member within the passageway, the closure member having a normally seated position in which the port or ports are closed and an unseated position in which the passageway is open to atmosphere, the closure member being constructed and disposed so that any suction at the inlet which might cause return flow of liquid effects an unseating of the closure member.

The invention also includes an anti-siphon device as aforesaid, in which a plurality of ports are provided and disposed in relation to the closure member so that any air flow through the ports to the passageway caused by suction at the inlet will hold the closure member in its unseated position.

The invention also includes an anti-siphon device, comprising a casing having an inlet and an outlet for liquid and a passageway within the device allowing communication between the inlet and outlet, and a freely movable closure member within the said passageway which, in a seated position, closes at least one port leading from the passageway to atmosphere during normal flow of liquid through the device, the said closure member having a part thereof downstream of the port or ports whereby any return flow of liquid impinges against the said part to move the closure member to an unseated position and vent the passageway to atmosphere.

The said part of the closure member downstream of the port or ports may be disc shaped or spherical and may be buoyant in water.

The invention also includes an anti-siphon device as aforesaid in which the closure member is funnel shaped to seat on a complementary shaped portion of the passageway and the port or ports is or are so positioned as to be closed by the conical part thereof. The said conical part may be provided with apertures out of register with the port or ports when the closure member is in the seated position but which become at least partly in register when the closure member becomes unseated. The said apertures may be so shaped that the flow of air therethrough, when the closure member is unseated, maintains the closure member unseated.

The invention further includes the closure member forming a valve clack which is adapted to seat on a seating member upstream of the closure member when the closure member has moved to open the port or ports. Alternatively, a part of the closure member downstream of the port or ports may form a clack adapted to seat on a seating member downstream of the port or ports to form a one-way valve arrangement.

The said closure member may be in the form of a ring.

The invention further includes an anti-siphon device as aforesaid in combination with a ball float valve assembly with the said device situated downstream of the said assembly.

The invention will now be described in more detail with reference to the accompanying drawings which illustrate various embodiments, by way of example only. In the drawings:

FIG. 3 is a diagrammatic cross-sectional view of a further embodiment of anti-siphon device according to the invention;

FIG. 4 is a diagrammatic cross-sectional view of another embodiment of anti-siphon device in accordance with the invention; and FIG. 5 is a diagrammatic half cross-sectional view of a still further embodiment of anti-siphon device in accordance with the invention.

Figure 2:
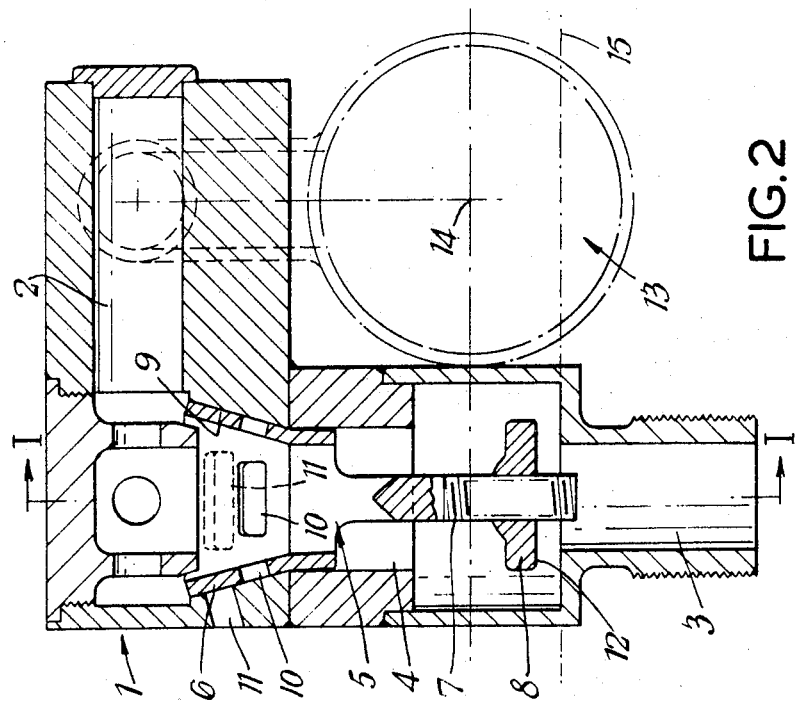
FIG. 2 is a diagrammatic cross-sectional view on the line II—II of FIG. 1.
Figure 1:
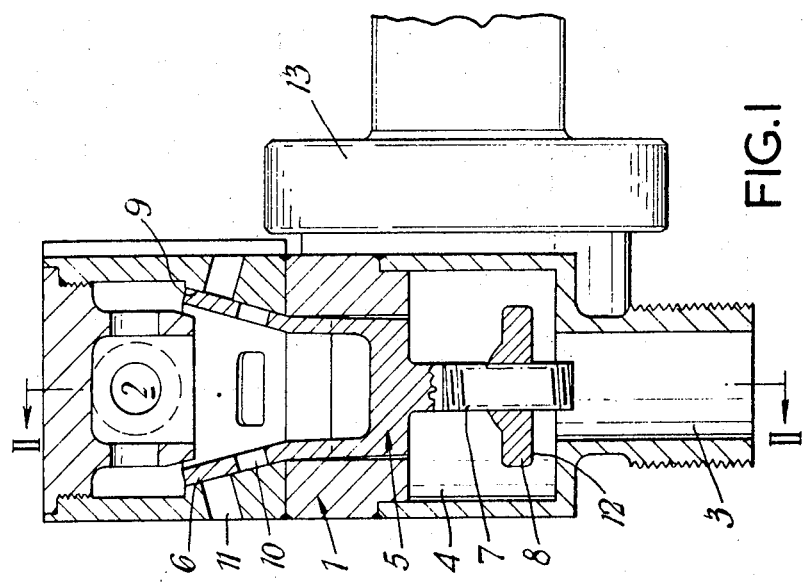
FIG. 1 is a diagrammatic cross-sectional view on the line I—I of FIG. 2 of an anti-siphon device in accordance with the invention.

Referring first to FIGS. 1 and 2, an anti-siphon device includes a casing or housing 1 having an inlet 2 and an outlet 3 and a passageway 4 between the inlet and outlet for the passage of a liquid, for example, water. Within the passageway 4 is a closure member 5 which is funnel shaped and has a conical portion 6 and a stem 7 having a downstream actuating part 8 extending laterally therefrom. The conical portion 6 seats within a complementary shaped portion 9 of the passageway 4 and is provided with one or more apertures 10 (in this embodiment three such apertures 10 are provided) which, when the conical shaped portion 6 is in its seated, i.e., closed position as indicated in the Figures, are out of register with ports 11 which allow communication between the passageway 4 and atmosphere. The part 8 has a face 12 which faces downstream, i.e., towards the outlet 3.

The closure member 5 is freely movable within the passageway 4 and the device will be so installed that the closure member seats by gravity and is assisted in seating by the normal flow of liquid through the device from the inlet to the outlet.

The device, during use, will be connected to a ball float valve assembly generally indicated at 13, the main axis 14 of this assembly being very slightly above the normal water level 15 of the tank when filled. The anti-siphon device will be downstream of the ball float valve assembly.

Although in FIGS. 1 and 2 the casing or housing 1 and ball float valve assembly 13 have been shown as separate parts it will be appreciated that these may be combined into a single unit.

During use, when the water level 15 falls, due to water being taken from the tank, the consequent lowering of the ball float will open the valve in the assembly 13 and permit water under pressure to flow into the assembly and thence to inlet 2 of the anti-siphon device. From the inlet 2, the water will flow into passageway 4 and then out of the outlet 3 through the downpipe and into the tank. If any back pressure develops and there is any return flow of water into the outlet 3, this will impinge upon the face 12 which will immediately lift the conical portion 6 of the closure member away from its seat against the surface 9 and open the ports 11. This opening will be achieved by conical portions 6 being raised vertically and the apertures 10 becoming at least in part in register with the ports 11. Air from atmosphere will immediately flow to within the passageway 4 through ports 11 and the suction upstream will draw in air in preference to drawing water up through the downpipe. Thus, the continuum of water will be broken and no contaminated water can find its way back into the mains.

The apertures 10 may be so shaped that, when they become partly in register with the ports 11, the inflowing air tends to react against the side walls of the apertures 10 to assist in maintaining the conical portion 6 of the closure member in the open i.e., unseated position. As soon as the flow of air ceases, the closure member will return to its closed position under the influence of gravity.

Because of the presence of part 8, which may be in the form of a disc, sphere, or a star or spider-shaped flat plate, water during normal flow will impinge upon the upper surface of this part and assist in retaining the conical portion 6 of the closure member in its closed position so that no water can escape via ports 11.

The diagrammatic FIG. 3, which illustrates a further embodiment, shows a casing or housing 20 with a passageway 21, the casing 20 having port 22 leading from the passageway 21 to atmosphere. A substantially cylindrical closure member 23 seals with the casing by sealing member 24 and an annular seal 25 is provided between the closure member 23 and the wall of passageway 21. A part 26 is carried by the closure member 23 and is positioned downstream of the ports 22.

The modified construction illustrated in FIG. 3 operates substantially similarly to the operation of the embodiment of FIGS. 1 and 2 and the differences in construction will be appreciated by persons skilled in the art.

Referring now to FIG. 4, a casing or housing 27 has an inlet 28 and outlet 29 and passageway 30. Normal flow of water (or other liquid or gas) is in the direction of arrow 31. A closure member 32 is funnel-shaped and preferably of a light weight plastics material and normally seats within tapered portion 33 of passageway 30. The closure member has an opening 34 therein through which water may normally flow. The casing 27 has a plurality (three are preferred) of ports 35 which are closed by the closure member 32 when in its seated position. If any sub-pressure or suction occurs at inlet 28 which might cause a return flow of water opposite to the direction or arrow 31, there will be an air pressure differential between inlet 28 and ports 35 which will result in air flow through ports 35 causing an unseating of closure member 32 and hence a rapid neutralization of the suction. This will prevent any such suction bringing about return flow of water.

Referring now to FIG. 5, a casing 36 has an inlet 37 and outlet 38 with passageway 39 therebetween. A closure member 40 is somewhat similar to that of the FIG. 3 embodiment being essentially cylindrical with a flange 41 at its upper end. This flange 41 closes ports 42. When suction occurs at the inlet 37, the closure member 40 will be unseated and open ports 42. The closure member 40 will seat against seat 43 upstream of the ports 42 and hence prevent any return flow of water from outlet 38 to the inlet 37.

In an alternative embodiment, the part 26 of the FIG. 3 embodiment seats against a seating member 26a, when the closure member 23 moves away from sealing member 24. The seating member 26a is located downstream of port 22 and extends from the casing 20 into passageway 21.

The part of the closure member downstream of the port or ports may be buoyant in water to assist in unseating the closure member on return flow. This may be of particular usefulness in systems in which it is desirable for the closure member to be unseated at frequent intervals to ensure it does not stick in the seated position. Even if there is no rapid return flow of water, having a buoyant part may be useful because even a gradual rise in the water level will unseat the closure member.

The anti-siphon device of the present invention is particularly applicable to a water storage tank of a domestic water closet as well as other domestic water storage tanks but may find other uses in the commercial field.

I claim:

1. An anti-siphon device, comprising:
a housing having an inlet opening and an outlet opening with a passageway connecting said inlet opening and said outlet opening;
seat means in said passageway, said housing having a port means communicating with the atmosphere and opening into said seat means;
a member disposed in said passageway and having an opening extending completely therethrough for the passage of fluid flowing in either direction through said housing;
said member including an imperforate portion configured and arranged for cooperation with and engagement with said seat means to close said port means; and
fixed reaction surface means on said member exposed to the flow of fluid in either direction through said housing and through said member, said member being movable in said passageway, by fluid flowing through said housing and through said member from said inlet to said outlet and reacting on said reaction surface means, to a first position with said imperforate portion cooperating with and in engagement with said seat means, said member being movable in said passageway, by fluid flowing into said housing from said outlet toward said inlet and reacting on said reaction surface means, from said first position to a second position with said imperforate portion spaced from said seat means permitting communication between the atmosphere and the interior of said housing whereby said inlet passage is connected to atmosphere and fluid in said housing will flow through said port means to atmosphere.

2. An anti-siphon device as defined in claim 1, the improvement further comprising said member being funnel shaped with a conical part thereof comprising said imperforate surface, and
said seat means in said passageway being of complementary shape to the shape of said member, said port means being so positioned as to be closed by said conical part.

3. An anti-siphon device as defined in claim 2, the improvement further comprising said conical part of said member being provided with apertures out of register with said port means when said closure member is in its seated first position but which become at least part in register when said member becomes unseated.

4. An anti-siphon device as defined in claim 1, the improvement further comprising a fixed seating member upstream of said member in said passageway, said member having a sealing surface for cooperation with said seating member and when unseated in said second position sealing with said seating member.

5. An anti-siphon device according to claim 1 in which said port means comprises a plurality of ports, and said imperforate portion provides a reaction surface so disposed in relation to said seat means and said ports that said member will be moved from said first position to said second position as a result of air at atmospheric pressure in said ports acting on said imperforate surface when the pressure in said passageway is below ambient atmospheric pressure.

6. An anti-siphon device according to claim 1 in which said reaction surface means comprises an actuating part rigid with said member and positioned downstream of said port means.

7. An anti-siphon device according to claim 6, the improvement further comprising a fixed seat member in said passageway located downstream of said port means, said actuating part having a sealing surface for cooperation with said fixed seat member, and when said member is unseated in said second position, said sealing surface engages said fixed seat member and closes said passageway to the flow of fluid through said housing from said outlet to said inlet.

8. An anti-siphon device as defined in claim 6, the improvement further comprising said actuating part being disc shaped.

9. An anti-siphon device as defined in claim 6 in which said seat means comprises a pair of spaced apart annular seals, and said port means opens into the interior of said housing intermediate said annular seals.

* * * * *